(12) United States Patent
Yamamoto et al.

(10) Patent No.: US 8,917,511 B2
(45) Date of Patent: Dec. 23, 2014

(54) WIRELESS POWER TRANSFER SYSTEM AND POWER TRANSMITTING/RECEIVING DEVICE WITH HEAT DISSIPATION STRUCTURE

(75) Inventors: Hiroshi Yamamoto, Osaka (JP); Hiroshi Kanno, Osaka (JP)

(73) Assignee: Panasonic Corporation, Osaka (JP)

( * ) Notice: Subject to any disclaimer, the term of this patent is extended or adjusted under 35 U.S.C. 154(b) by 562 days.

(21) Appl. No.: 13/169,186

(22) Filed: Jun. 27, 2011

(65) Prior Publication Data

US 2012/0001496 A1 Jan. 5, 2012

Related U.S. Application Data

(60) Provisional application No. 61/359,859, filed on Jun. 30, 2010.

(51) Int. Cl.
*H05K 7/20* (2006.01)
*H01F 38/14* (2006.01)
*H02J 17/00* (2006.01)
*H01F 27/28* (2006.01)

(52) U.S. Cl.
CPC ............... *H01F 38/14* (2013.01); *H02J 17/00* (2013.01); *H01F 27/2876* (2013.01)
USPC ........... 361/717; 361/688; 361/709; 361/712; 361/715; 174/252; 174/260; 174/138 A; 307/104; 343/895

(58) Field of Classification Search
USPC ........................ 361/676–678, 679.46–679.54, 361/688–722, 760–762, 764, 831
See application file for complete search history.

(56) References Cited

U.S. PATENT DOCUMENTS

| | | | |
|---|---|---|---|
| 5,412,304 A | 5/1995 | Abbott | |
| 6,693,541 B2* | 2/2004 | Egbert | 340/572.7 |
| 6,744,335 B2* | 6/2004 | Ryhanen et al. | 333/185 |
| 7,135,782 B2* | 11/2006 | Nishikawa | 257/796 |
| 8,508,076 B2* | 8/2013 | Kanno | 307/104 |
| 2003/0021834 A1 | 1/2003 | Petito | |
| 2008/0278264 A1 | 11/2008 | Karalis et al. | |
| 2010/0109445 A1* | 5/2010 | Kurs et al. | 307/104 |
| 2010/0225271 A1 | 9/2010 | Oyobe et al. | |

(Continued)

FOREIGN PATENT DOCUMENTS

| | | |
|---|---|---|
| EP | 2 383 858 A1 | 11/2011 |
| JP | 07-066048 A | 3/1995 |

(Continued)

OTHER PUBLICATIONS

Form PCT/ISA/210, 220 and 237 with partial English language translation, corresponding International Application No. PCT/JP2011/003687, issued Sep. 20, 2011.

(Continued)

*Primary Examiner* — Courtney Smith
(74) *Attorney, Agent, or Firm* — Renner, Otto, Boisselle & Sklar, LLP

(57) ABSTRACT

A wireless power transfer system and power transmitting/receiving device according to the present invention include an antenna (resonator) 109 and a heat dissipation structure 111 with an electrically conductive thermal conductor 11, a portion of which makes thermal contact with the inductor 13 of the antenna 109 with an electrical insulator 12 interposed between them. The thermal conductor 11 is arranged to form no electrically closed loop.

9 Claims, 11 Drawing Sheets

(56) References Cited

U.S. PATENT DOCUMENTS

| | | | |
|---|---|---|---|
| 2010/0296225 A1* | 11/2010 | Smith et al. | 361/311 |
| 2011/0266882 A1* | 11/2011 | Yamamoto et al. | 307/104 |
| 2012/0063093 A1* | 3/2012 | Meinel et al. | 361/707 |

FOREIGN PATENT DOCUMENTS

| | | |
|---|---|---|
| JP | 07-169628 A | 7/1995 |
| JP | 10-108376 A | 4/1998 |
| JP | 2005-108654 | 4/2005 |
| JP | 2006-128397 A | 5/2006 |
| JP | 2006-129605 | 5/2006 |
| JP | 2006-202664 | 8/2006 |
| JP | 2008-087733 | 4/2008 |
| JP | 2009-004513 | 1/2009 |
| JP | 2010-051137 A | 3/2010 |
| JP | 4478729 B | 3/2010 |

OTHER PUBLICATIONS

International Preliminary Examination Report for corresponding International Application No. PCT/JP2011/003687 dated May 29, 2012.

* cited by examiner

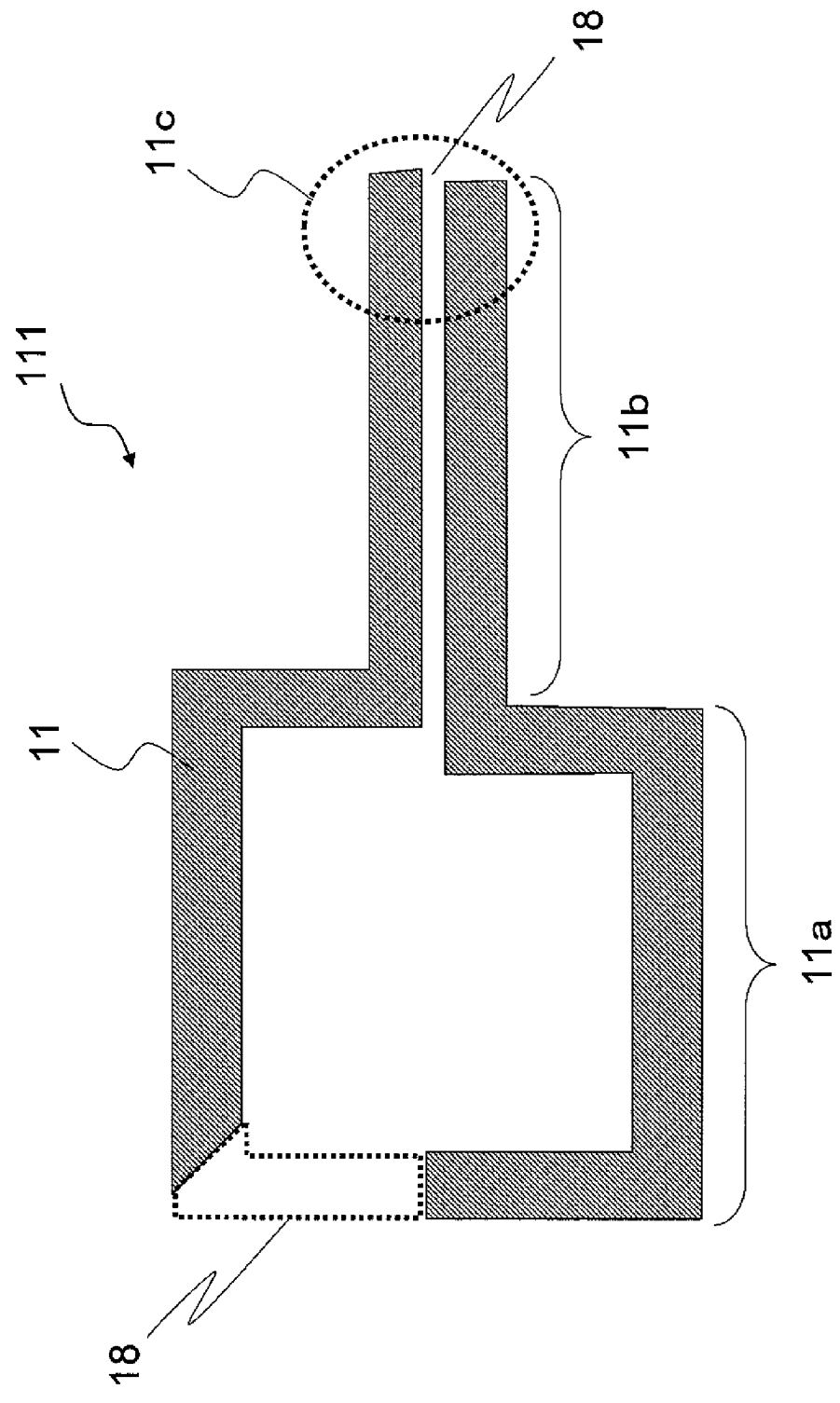

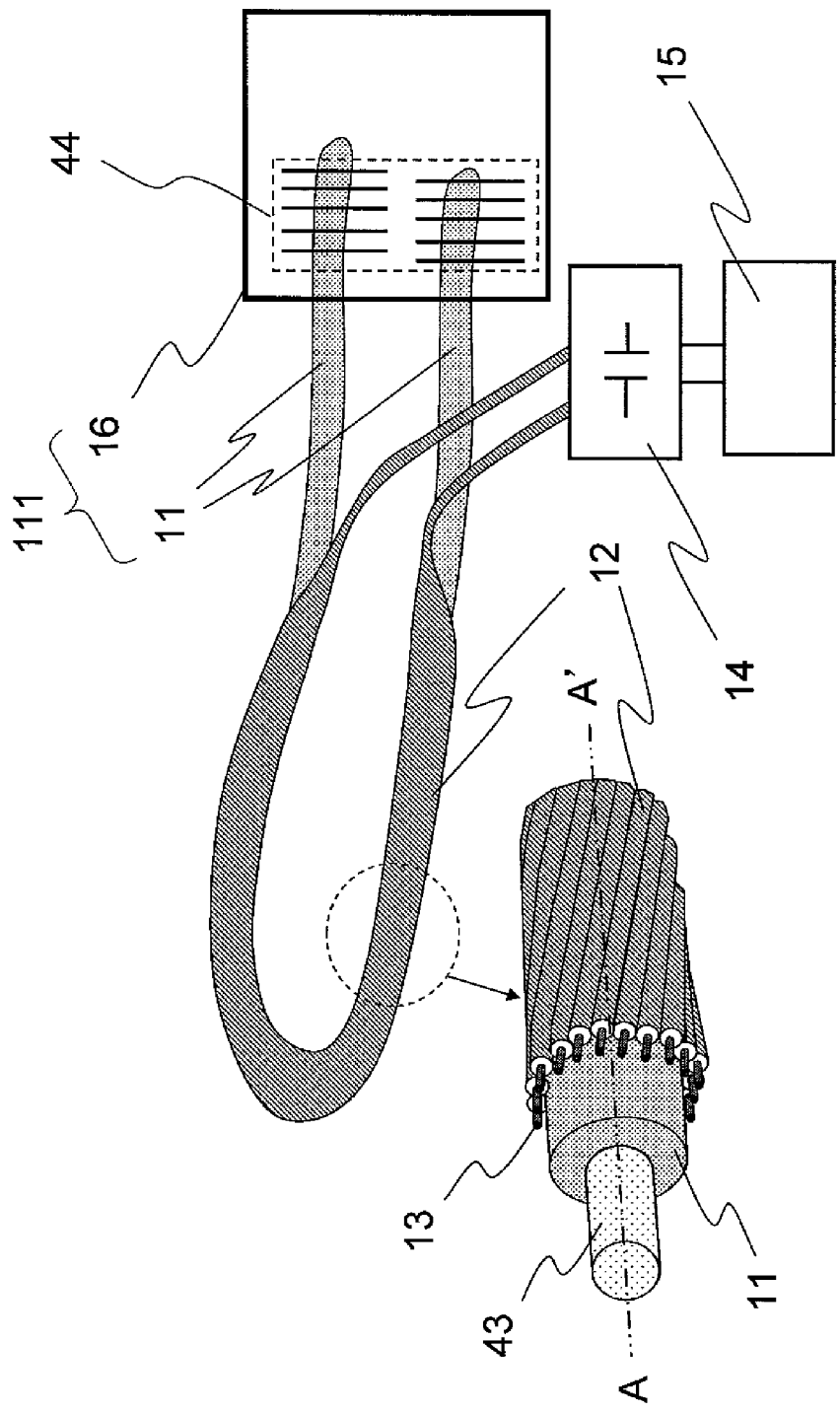

*FIG.6*
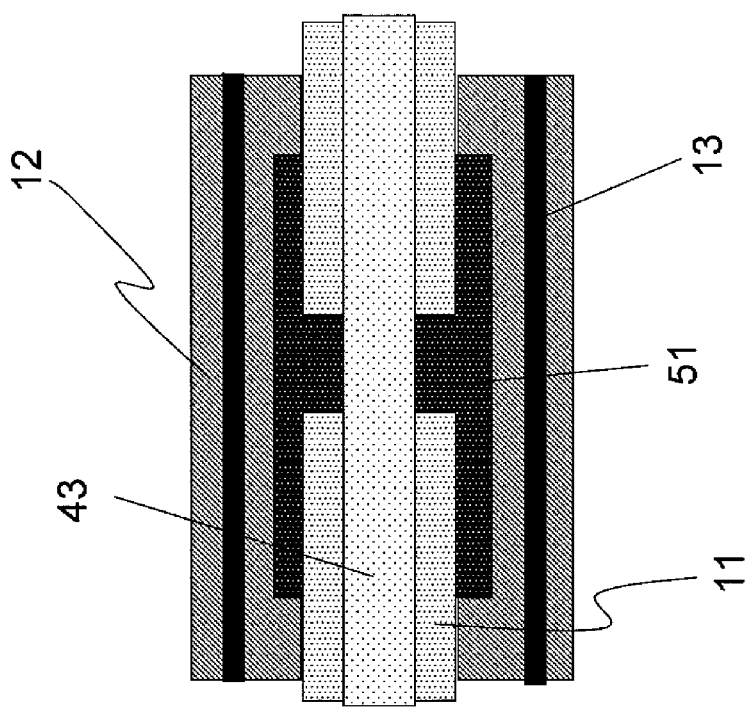
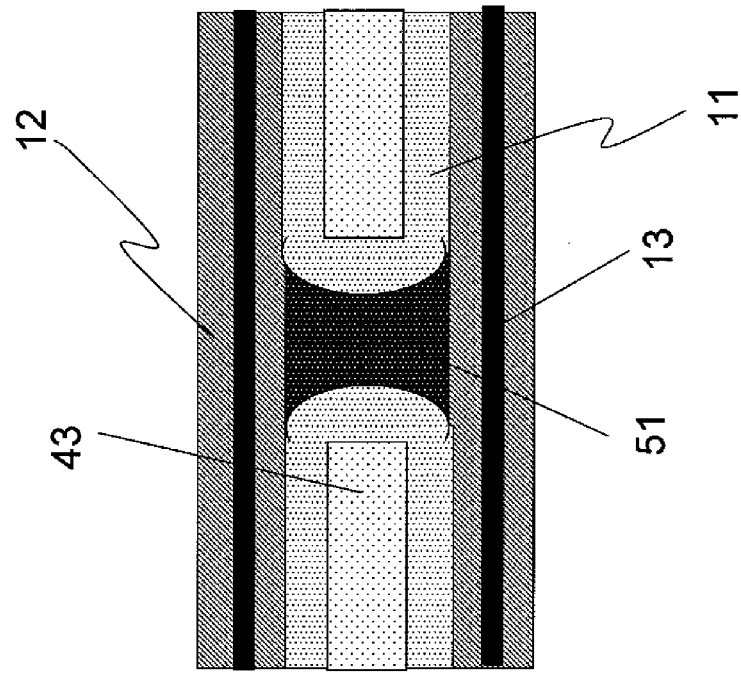

WIRELESS POWER TRANSFER SYSTEM AND POWER TRANSMITTING/RECEIVING DEVICE WITH HEAT DISSIPATION STRUCTURE

This application claims priority under 35 USC §119(e) to U.S. Provisional Application No. 61/359,859 filed on Jun. 30, 2010, the entire contents of which are incorporated herein by reference.

BACKGROUND OF THE INVENTION

1. Field of the Invention

The present invention relates to the heat dissipation structure of a power transmitting/receiving antenna for use in a wireless power transfer system for charging, supplying or collecting energy by a non-contact method.

2. Description of the Related Art

Non-contact wireless energy transfer technologies have attracted increasing attention these days in order to increase the mobility and waterproofness or dustproofness of various electronic devices as much as possible. This is because by transmitting electric power by such a non-contact method, various wireless consumer electronic appliances such as a wireless wall-mounted TV monitor are realized and a big moving object such as an electric car can be easily charged and supplied with electric power.

As a novel non-contact power transfer method that would replace the conventional one that uses electromagnetic induction, a resonant magnetic coupling method has been proposed in United States Patent Application Laid-Open Publication No. 2008/0278264-A1, for example. According to such a method, resonance mode coupling between resonators is used to realize longer-range and higher-efficiency power transfer than the conventional electromagnetic induction method. They believe that particularly if a resonant magnetic field is used, influence on surrounding organisms would be reduced compared to a situation where a resonant electric field is used.

Meanwhile, part of the loss that has been caused by such a resonant magnetic coupling type power transfer system turns into heat in the resonator. The heat that has been generated by the resonator affects the temperature characteristic of the resonator itself or its surrounding circuits so much as to decrease the transfer efficiency eventually. Particularly when a huge electric power is transmitted, a significant quantity of heat will be generated, and therefore, the heat that has been generated by the resonator should be dissipated due to safety considerations, too.

As for a structure for dissipating the heat, a heat dissipation structure for use in a non-contact power supply device of an electromagnetic induction type is disclosed in Japanese Patent Application Laid-Open Publication No. 2008-087733, for example. That heat dissipation structure is designed to dissipate heat by coating the surface of primary and secondary coils and that of primary and secondary magnetic cores with a thermal conductor that is electrically insulating and not affected by electromagnetic field.

Japanese Patent Applications Laid-Open Publications No. 2009-004513 and No. 2006-129605 disclose another heat dissipation technique applicable to an electromagnetic induction type power supply device. According to that technique, heat is dissipated by bringing a heat dissipation structure, which is made of a metallic conductor, into close contact with the surface of an inductor.

Furthermore, Japanese Patent Application Laid-Open Publication No. 2005-108654 discloses a technique for cooling an excitation coil by providing a cooling member at the core of a Litz wire, which has been formed by twisting together a number of fine conductive wires. According to that patent document, examples of the cooling members include a PDA based polymer materials with high thermal conductivity, a resin to which carbon-based filament has been added, aluminum and heat pipe.

According to the technique disclosed in Japanese Patent Application Laid-Open Publication No. 2008-087733, the heat dissipation structure is made of an electrical insulator, which ordinarily has a lower thermal conductivity than an electrical conductor. That is why the degree of heat dissipation achieved is lower than when an electrical conductor is used to make the heat dissipation structure.

On the other hand, according to the technique disclosed in Japanese Patent Application Laid-Open Publication No. 2009-004513, an electrical conductor, which usually has a higher thermal conductivity than an electrical insulator, is used as a material for the heat conducting layer, and therefore, the degree of heat dissipation achieved is no longer low. However, the heat is dissipated with the heat dissipating end of the heat conducting layer kept in close contact with either the ground of its internal circuit or the housing connected to the ground without subjecting that end to any insulation treatment. Thus, the electrically conductive heat conducting layer forms an electrically closed loop. As a result, due to the magnetic field generated while electric power is being transmitted, induced current will flow through the heat conducting layer, thus causing electrical conduction loss. Consequently, according to the technique disclosed in Japanese Patent Application Laid-Open Publication No. 2009-004513, the power transfer efficiency decreases.

Japanese Patent Application Laid-Open Publication No. 2006-129605 does disclose a heat dissipation structure that does not form such an electrically closed loop. However, since the heat dissipation structure is supposed to be arranged on the surface of an inductor, which generates heat, the degree of heat dissipation achieved could be low if the inductor either had a large turn number or were relatively thick.

Furthermore, with the heat dissipation structure disclosed in Japanese Patent Application Laid-Open Publication No. 2005-108654 adopted, the heat dissipation effect should be increased by the cooling member that is arranged in close contact with multiple conductive wires. However, if the cooling member is made of an electrical conductor, induced current will also be generated and the power transfer efficiency may also decrease as in Japanese Patent Application Laid-Open Publication No. 2009-004513 mentioned above.

It is therefore an object of the present invention to provide a heat dissipating technique for dissipating the heat, which has been generated by a resonator for use in a resonant magnetic coupling type wireless power transfer system, with the decrease in power transfer efficiency minimized.

SUMMARY OF THE INVENTION

A power transmitting/receiving device according to the present invention is designed to transmit and/or receive electric power in a wireless power transfer system that transfers the electric power wirelessly via a resonant magnetic field. The device includes: an antenna with an inductor; and a heat dissipation structure with an electrically conductive thermal conductor, a portion of which makes thermal contact with the inductor with an electrical insulator interposed between the conductor and the inductor and which is arranged to form no electrically closed loop.

In one preferred embodiment, the resonant frequency of the antenna is set to be as high as that of another antenna, which transfers the electric power to/from the former antenna.

In another preferred embodiment, the electrically conductive thermal conductor is not electrically grounded.

In still another preferred embodiment, the electrically conductive thermal conductor dissipates the heat that has been generated by the inductor by transferring that heat from the inductor to a distant location.

In this particular preferred embodiment, the heat dissipation structure includes a cooling member, which is arranged out of contact with the inductor, and the electrically conductive thermal conductor dissipates the heat that has been generated by the inductor by transferring that heat to the cooling member.

In yet another preferred embodiment, the inductor is formed of conductive wires, which are at least partially covered with the electrical insulator and which are wound spirally around at least a portion of the electrically conductive thermal conductor.

In a specific preferred embodiment, when projected onto the principal plane of the inductor, that portion of the electrically conductive thermal conductor that makes thermal contact with the inductor is less wide than the turns of the inductor.

In yet another preferred embodiment, that portion of the electrically conductive thermal conductor that makes thermal contact with the inductor at least partially falls within a range that is defined by the profile of the inductor.

In yet another preferred embodiment, the electrically conductive thermal conductor is electrically disconnected inside of the range that is defined by the profile of the inductor.

In an alternative preferred embodiment, the electrically conductive thermal conductor is electrically disconnected outside of the range that is defined by the profile of the inductor.

In yet another preferred embodiment, the electrically conductive thermal conductor has a hollow pipe structure and is electrically disconnected at least partially.

In this particular preferred embodiment, the electrically disconnected parts of the electrically conductive thermal conductor are joined by a pipe that is made of an electrical insulator.

In a specific preferred embodiment, a cooling medium is enclosed in the electrically conductive thermal conductor.

In yet another preferred embodiment, the electrically disconnected parts of the electrically conductive thermal conductor are located near a bent portion of the inductor.

In yet another preferred embodiment, that portion of the electrically conductive thermal conductor that makes thermal contact with the inductor is arranged closer to the outer edge of the turns of the inductor than to the center thereof.

A wireless power transfer system according to the present invention is designed to transmit electric power wirelessly via a resonant magnetic field. The system includes: a power transmitting section with a power transmitting antenna, from which RF energy is sent out; a power receiving section with a power receiving antenna, which receives at least a part of the RF energy; and a heat dissipation structure with an electrically conductive thermal conductor, a portion of which makes thermal contact with the inductor of the power transmitting antenna and/or the inductor of the power receiving antenna with an electrical insulator interposed between the conductor and the inductor and which is arranged to form no electrically closed loop.

In one preferred embodiment, the resonant frequencies of the power transmitting and receiving antennas are set to be equal to each other.

A wireless power transfer system and power transmitting/receiving device according to the present invention dissipates heat using an electrically conductive thermal conductor that is designed to form no electrically closed loop. Consequently, the heat that has been generated by the inductor of a resonator can be dissipated with the decrease in power transfer efficiency minimized.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 2B illustrates an exemplary heat dissipation structure 111 for use in the wireless power transfer system of the present invention.

FIG. 5 illustrates a general configuration for a power receiver as a second preferred embodiment of the present invention.

FIGS. 6(*a*) and 6(*b*) illustrate two examples of decoupled portions to be cut through the thermal conductor 11 according to the second preferred embodiment of the present invention.

DETAILED DESCRIPTION OF PREFERRED EMBODIMENTS

Figure 1A:
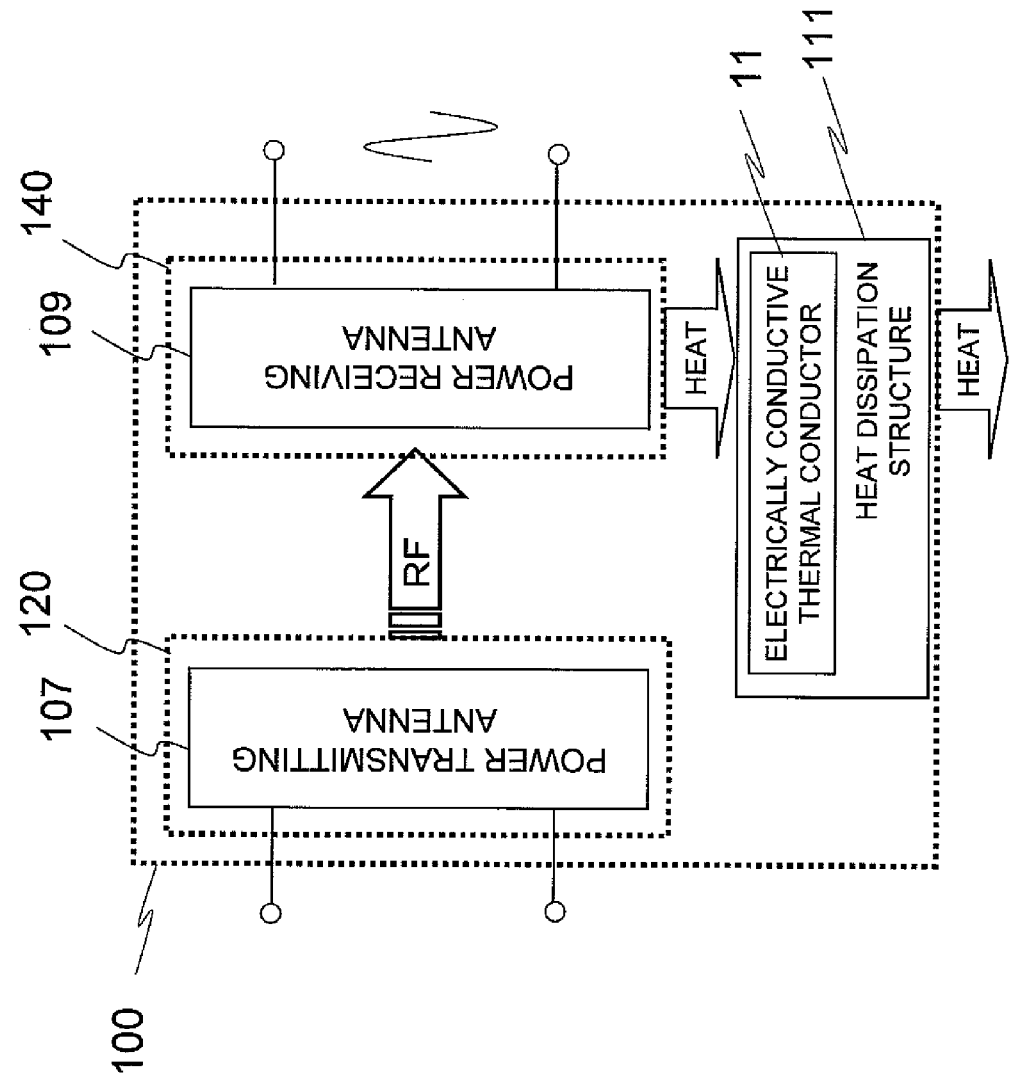
FIG. 1A is a block diagram illustrating a basic configuration for a wireless power transfer system according to the present invention.

Hereinafter, an essential arrangement for a wireless power transfer system according to the present invention will be described with reference to FIGS. 1A and 1B. FIG. 1A is a block diagram illustrating an exemplary configuration for a wireless power transfer system 100 according to the present invention. As shown in FIG. 1A, the wireless power transfer system 100 includes a power transmitter 120 with a power transmitting antenna 107 for sending out radio frequency (RF) energy, a power receiver 140 with a power receiving antenna 109 for receiving at least part of the RF energy that has been sent out from the power transmitting antenna 107, and a heat dissipation structure 111 with an electrically conductive thermal conductor 11 for transferring the heat that has been generated by the power receiving antenna 109 to the external space. The electrically conductive thermal conductor 11 does not directly contact with the power receiving antenna 109 but makes thermal contact with the inductor of the power receiving antenna 109 with an electrical insulator (not shown) interposed between them. As used herein, if something is "makes thermal contact with" something else, then it means that heat can be exchanged between them by heat conduction. The electrically conductive thermal conductor 11 receives heat from the inductor of the power receiving antenna 109 and releases that heat to the external space. In this manner, the heat generated by the inductor of the power receiving antenna 109 can be dissipated with electrical insulation maintained. In the example illustrated in FIG. 1A, the heat dissipation structure 111 is provided for the power receiving antenna 109 so as to dissipate the heat generated by the inductor of the power receiving antenna 109. However, the heat dissipation structure 111 may also be arranged so as to dissipate the heat that has been generated by the inductor of the power transmitting antenna 107. Still alternatively, the heat dissipation structure 111 may even be provided for each of the power transmitting antenna 107 and the power receiving antenna 109.

Figure 1B:
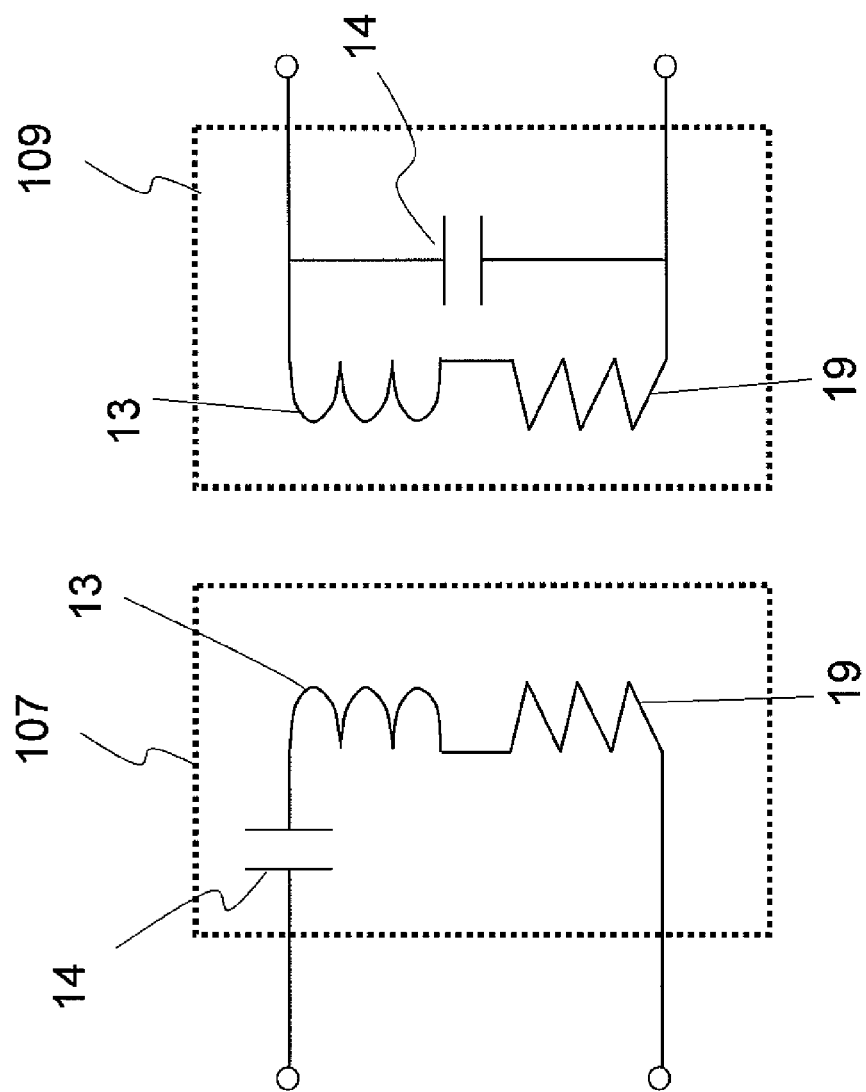
FIG. 1B is an exemplary equivalent circuit diagram illustrating how the power transmitting antenna 107 and the power receiving antenna 109 may be connected together in the wireless power transfer system of the present invention.

FIG. 1B is an exemplary equivalent circuit diagram illustrating how the power transmitting antenna 107 and the power receiving antenna 109 are connected together. Each of the power transmitting antenna 107 and the power receiving antenna 109 is a resonant circuit including an inductor 13, a capacitor 14 and a resistor 19. In the example illustrated in FIG. 1B, the power transmitting antenna 107 is a series resonant circuit and the power receiving antenna 109 is a parallel resonant circuit. However, this is only an example, and it does not matter whether each of these antennas is a series resonant circuit or a parallel resonant circuit.

The inductance of each inductor 13 and the capacitance of each capacitor 14 are preferably determined so that the resonant frequencies fT and fR of the power transmitting antenna 107 and the power receiving antenna 109 are equal to each other. To transfer energy with high efficiency by taking advantage of the coupling phenomenon between the two resonators, ideally fT=fR should be satisfied, but actually there will be no problem as long as there is only a little difference between fT and fR. In this description, if the frequency fT is equal to the frequency fR, then the following inequality (1) should be satisfied:

$$|fT-fR| \leq fT/QT + fR/QR \qquad (1)$$

where QT is the Q factor of the power transmitting antenna 107 as a resonator and QR is the Q factor of the power receiving antenna 109 as a resonator. In general, if the resonant frequency is identified by X and the Q factor of a resonator is identified by Qx, a frequency range in which that resonator produces resonance is obtained by X/Qx. If this Inequality (1) is satisfied, energy can be transferred between the two resonators by resonant magnetic coupling. In the following description, both of these resonant frequencies fT and fR are supposed to be equal to a predetermined frequency f0 (i.e., fT=fR=f0 is supposed to be satisfied). Specifically, the frequency f0 may be set within the range of 50 Hz to 300 GHz and preferably falls within the range of 10 kHz to 1 GHz and more preferably falls within the range of 20 kHz to 20 MHz.

Although not shown in FIG. 1A, the power transmitter 120 includes not only the power transmitting antenna 107 but also an oscillator, a power supply and so on. The power transmitting antenna 107 receives RF energy with the frequency f0 from the oscillator and gets magnetic field energy with the frequency f0 distributed in the surrounding space. As a result, a resonant magnetic field, which produces resonances at the frequency f0, is generated around the power transmitting antenna 107. The power receiving antenna 109 of the power receiver 140 is coupled to that resonant magnetic field, and therefore, can receive the RF energy from the power transmitter 120. The power receiver 140 may include an internal circuit (not shown) and a load (not shown, either). In that case, the power receiving antenna 109 transfers the RF energy received to the load by way of the internal circuit, thereby activating the power receiver 140.

When electric power is transferred between the power transmitting antenna 107 and the power receiving antenna 109 via the resonant magnetic field, heat is usually generated in the inductor 13, which is an electrical conductor, and the transfer efficiency decreases. For that reason, the heat that has been generated by the inductor 13 should be dissipated.

In the wireless power transfer system 100 of the present invention, the heat dissipation structure 111 is arranged in the vicinity of the inductor 13 of the power transmitting antenna 107 and/or the inductor 13 of the power receiving antenna 109, thereby dissipating the heat that has been generated by the inductor 13. Hereinafter, it will be described with reference to FIGS. 2A, 2B and 2C exactly how to dissipate the heat according to the present invention.

Figure 2A:
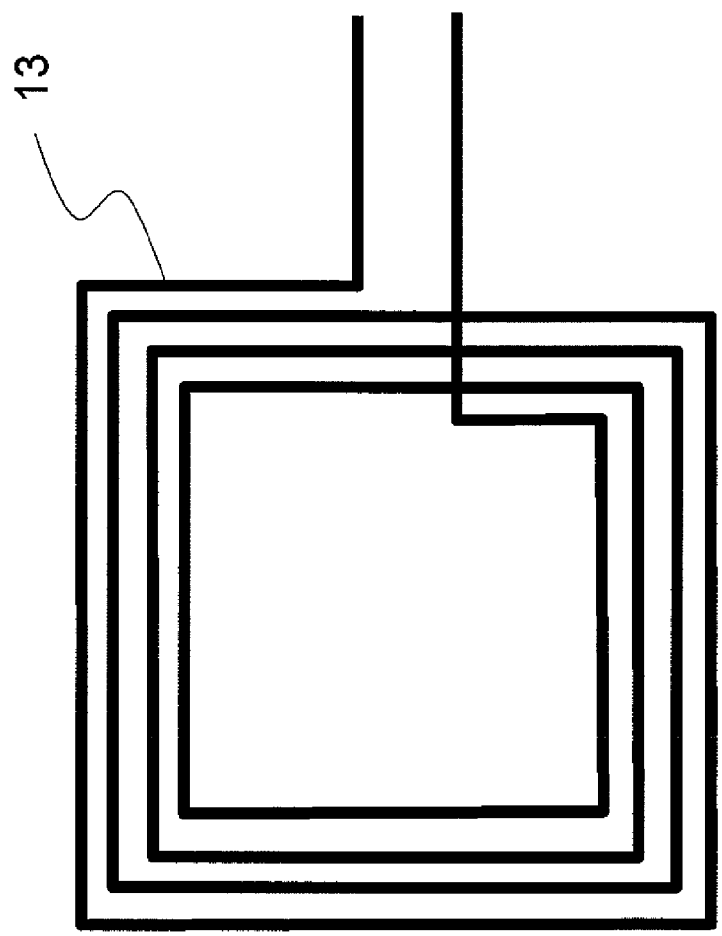
FIG. 2A illustrates an exemplary shape of the inductor 13 in the wireless power transfer system of the present invention.

FIG. 2A illustrates an exemplary shape of the inductor 13. According to the present invention, the inductor 13 may have any known shape. In this example, however, the inductor 13 is supposed to be a conductive wire (turns) in a rectangular spiral shape, of which the maximum turn number is four. The size of the inductor 13 may be appropriately determined according to the scale of the device to which this wireless power transfer system is applied. For example, in the case of a small electronic device, the feature size of the inductor 13 (which may be the shorter side length if the inductor 13 has a rectangular shape or may be the diameter if the inductor 13 has a circular shape) may be in the range of several millimeters to several centimeters. On the other hand, in the cases of huge power supply facilities or electric cars, the feature size of the inductor 13 may be in the range of several ten centimeters to several meters.

FIG. 2B illustrates an example of the heat dissipation structure 111 for dissipating the heat that has been generated by the inductor 13 shown in FIG. 2A. As shown in FIG. 2B, the heat dissipation structure 111 includes an electrically conductive thermal conductor 11 (which will be simply referred to herein as a "thermal conductor 11"). The thermal conductor 11 includes a contact portion 11a, which makes thermal contact with the inductor 13, and a transfer portion 11b, which transfers the heat to the external space. This thermal conductor 11 is preferably designed so that the contact portion 11a contacts with the majority of the turns of the inductor 13 over a broad range. By using such a thermal conductor 11, the heat generated by the inductor 13 can be released efficiently.

The thermal conductor 11 is also designed to form no electrically closed loop. In the example illustrated in FIG. 2B, the thermal conductor 11 has a decoupled portion 18 in each of the contact portion 11a and the transfer portion 11b. By using such a thermal conductor 11, it is possible to prevent induced current from flowing through the thermal conductor 11 under the magnetic field generated by the inductor 13.

The heat dissipation structure 111 may further include a cooling member (not shown) in addition to the thermal conductor 11. By connecting a cooling member to the heat-dissipating end 11c of the transfer portion 11b of the thermal conductor 11, the heat dissipation effect can be increased. If the cooling member is made of an electrical conductor, then the heat-dissipating end 11c of the thermal conductor 11 will be electrically connected. That is why the decoupled portion 18 of the thermal conductor 11 should be located where the thermal conductor 11 does not contact with the cooling member.

Figure 2C:
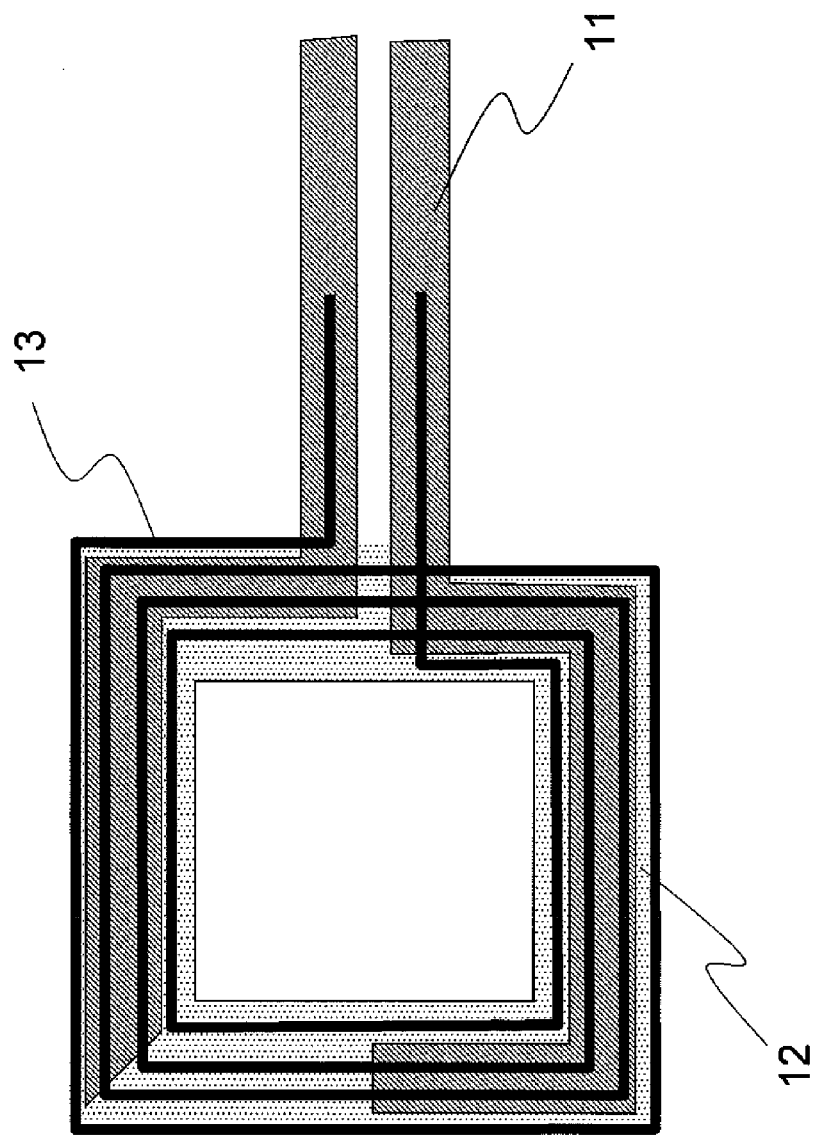
FIG. 2C illustrates the relative arrangement of the inductor 13 and the thermal conductor 11 in the wireless power transfer system of the present invention.

FIG. 2C illustrates the relative arrangement of the inductor 13 shown in FIG. 2A and the thermal conductor 11 shown in FIG. 2B. In the example illustrated in FIG. 2C, the thermal conductor 11 is arranged along the turns of the inductor 13. A layer of an electrical insulator 12 is interposed between the thermal conductor 11 and the turns of the inductor 13. It is preferred that the electrical insulator 12 be as thin as possible unless the insulator 12 is too thin to electrically insulate the thermal conductor 11 and the turns of the inductor 13 from each other.

By adopting such an arrangement, the heat generated by the inductor 13 can be dissipated efficiently by the thermal conductor 11. According to the present invention, the thermal conductor 11 does not form an electrically closed loop, and therefore, it is possible to prevent the magnetic field generated by the inductor 13 from producing induced current in the thermal conductor 11. Consequently, wireless power transfer efficiency can be kept much higher than a situation where the conventional heat dissipation structure is used.

The heat dissipation structure 111 of the present invention is applicable to not just such a wireless power transfer system including the power transmitter 120 and the power receiver 140 described above but also any other device that transmits and/or receives electric power (which will be referred to herein as a "power transmitting/receiving device"). Such a power transmitting/receiving device includes an antenna for transmitting and/or receiving electric power and a heat dissipation structure with an electrically conductive thermal conductor, a portion of which makes thermal contact with the inductor of the antenna with an electrical insulator interposed between them and which does not form an electrically closed loop. The power transmitting/receiving device may be the power transmitter 120 with the power transmitting antenna 107, the power receiver 140 with the power receiving antenna 109 or a device that transmits and receives electric power using the same antenna.

Hereinafter, preferred embodiments of the present invention will be described with reference to FIGS. 3 through 6. In the following description, the XYZ coordinates shown in these drawings will be used. Also, any pair of components shown in multiple drawings and having substantially the same function will be identified by the same reference numeral.

Embodiment 1

A first specific preferred embodiment of the present invention will now be described. This first preferred embodiment of the present invention is a power receiver that receives, and operates on, electric power that has been transmitted and supplied wirelessly from an external power transmitter through a resonant magnetic field. The power receiver may be a mobile electronic device such as a laptop or a cellphone, an electric car or a storage battery, to name just a few, but may also be any other device that operates with electric power supplied. It should be noted that the heat dissipation structure to be described below is also applicable in quite the same way to the power transmitting antenna of the power transmitter and the same effect will be achieved in that case, too.

Figure 3:
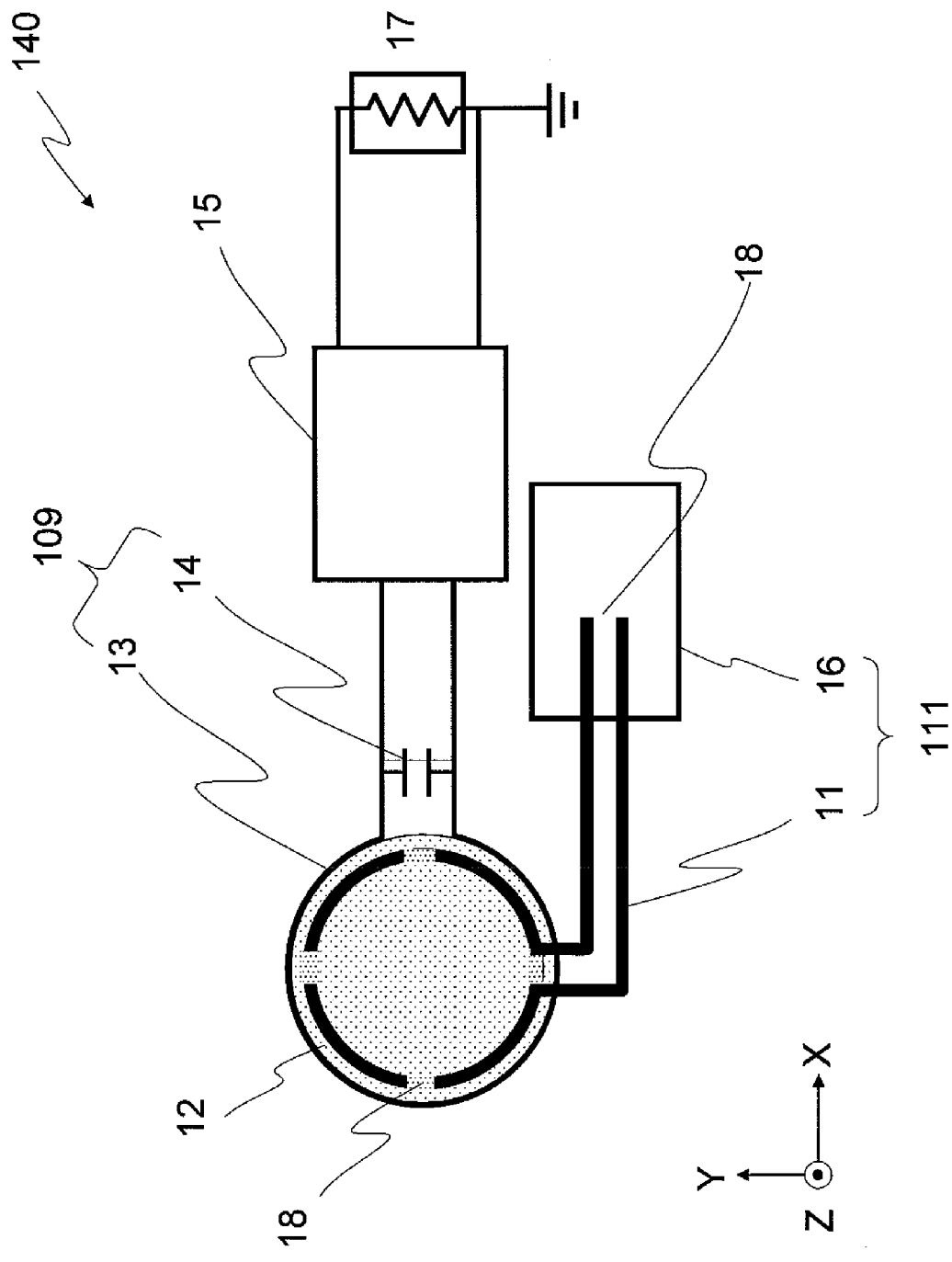
FIG. 3 illustrates a general configuration for a power receiver as a first preferred embodiment of the present invention.

FIG. 3 illustrates a general configuration for the power receiver 140 of this preferred embodiment. The power receiver 140 includes a power receiving antenna 109 that receives RF energy, a heat dissipation structure 111 for dissipating the heat that has been generated by the power receiving antenna 109, an internal circuit 15, and a load 17. The power receiving antenna 109 is a resonator including an inductor 13 and a capacitor 14. The heat dissipation structure 111 includes a thermal conductor 11 made of an electrical conductor and a cooling member 16 for cooling the thermal conductor 11, which makes thermal contact with the inductor 13 of the power receiving antenna 109 with a thermally conductive electrical insulator 12 interposed between them. The internal circuit 15 may be a rectifier, for example, and transforms the RF energy that has been received by the power receiving antenna 109 into DC energy and then supplies the DC energy to the load 17, which may be a normal electronic device or storage battery, for example. In this preferred embodiment, any arbitrary combination of known elements may be used as the internal circuit 15 and the load 17.

Hereinafter, the power receiving antenna 109 and the heat dissipation structure 111 of this preferred embodiment will be described in further detail.

The power receiving antenna 109 of this preferred embodiment is a resonant circuit including the inductor 13 and the capacitor 14 and can receive efficiently the RF energy that has been transmitted from the power transmitting antenna (not shown). The inductor 13 and the capacitor 14 are connected in parallel with each other in the arrangement shown in FIG. 3 but may also be connected together in series, too.

In this preferred embodiment, the inductor 13 is supposed to have either a spiral structure with a turn number of N (where N is an integer that is equal to or greater than two) or a loop structure with a turn number of one. However, the inductor 13 may have any other known structure. Also, the inductor 13 may have either a single-layer conductor pattern or a series connection of conductor patterns that are stacked one upon the other in multiple layers. The inductor 13 is preferably made of an electrical conductor with high electrical conductivity such as copper or silver. The spiral wire of the inductor 13 does not have to have a circular shape shown in FIG. 3 but may also have any other arbitrary shape. For example, the spiral wire may also have a rectangular shape, an elliptical shape or even an asymmetric shape. Nevertheless, if a rectangular spiral shape is adopted, the shape should have at least a certain radius of curvature at each of its corners because a wiring shape with steep angles would produce an excessively high concentration of RF current or an overly high density of magnetic field in the surrounding space, thus increasing the Joule heat generated and decreasing the transfer efficiency eventually. In the following description, the plane defined by the turns of the inductor 13 will be referred to herein as a "principal plane" of the inductor 13. And a plane that is parallel to the principal plane of the inductor 13 is defined herein as an "XY plane". It should be noted that if the turns of the inductor 13 is not located on the same plane but has a layered structure that has a thickness in the Z-axis direction, a plane that is defined by one of the wiring layers that has the largest area will be referred to herein as the "principal plane" of the inductor 13.

As the capacitor 14 of this preferred embodiment, any type of capacitor, which may have a chip shape, a lead shape or any other appropriate shape, may be used. Optionally, the capacitance produced between two levels of wires that interpose the air between them could also function as the capacitor 14.

The inductance of the system including the inductor 13, the electrical insulator 12 and the heat dissipation structure 111 and the capacitance of the capacitor 14 are determined so that the resonant frequency fR of the power receiving antenna 109 of this preferred embodiment becomes equal to the resonant frequency fT of the power transmitting antenna.

To equalize the resonant frequency of the power receiving antenna 109 with that of the power transmitting antenna, the capacitance C (F) of the capacitor 14 should satisfy the following Equation (2):

$$C = 1/((2\pi f)^2 \cdot L) \qquad (2)$$

where f (Hz) is the resonant frequency of the power transmitting and power receiving antennas and L (H) is the inductance value of the system consisting of the thermal conductor 11, the electrical insulator 12 and the inductor 13.

The inductance value L may be obtained by measuring the system consisting of the thermal conductor 11, the electrical insulator 12, and the inductor 13 using an impedance analyzer or a network analyzer, for example.

Next, the heat dissipation structure 111 of this preferred embodiment will be described in further detail.

The heat dissipation structure 111 includes a thermal conductor 11 and a cooling member 16. The thermal conductor 11 is preferably made of a material with a thermal conductivity of 100 W/mK or more (e.g., a copper or any other suitable metallic material). The thermal conductor 11 is arranged inside the turns of the inductor 13 so as to receive the heat from the inductor 13 via the thermally conductive electrical insulator 12. The electrical insulator 12 is interposed between the thermal conductor 11 and the inductor 13 to keep the thermal conductor 11 and the turns of the inductor 13 electrically insulated from each other. The thermal conductor 11 has its conducting path disconnected in at least one position by the decoupled portion 18. The thermal conductor 11 contacts with the cooling member 16, which is arranged out of contact with the inductor 13, and transfers the heat that has been generated by the inductor 13 to the cooling member 16.

The cooling member 16 may have a fin structure, for example, and gets convection generated by its fin, thereby dissipating the heat that has been conducted from the thermal conductor 11 to the external space. It should be noted that the cooling member 16 does not always have to dissipate the heat by generating convection but may also use any other method as long as the heat generated by the inductor 13 can be dissipated sufficiently. The power receiver 140 has only one cooling member 16 in the arrangement shown in FIG. 3 but may also have two or more cooling members 16. Furthermore, the cooling member 16 is not always built in the power receiver 140 but may also be arranged outside of the power receiver 140 as well.

Examples of materials for the thermally conductive electrical insulator 12 include silicone resin based materials and ceramic materials including aluminum fillers. Optionally, instead of using such materials, the electrical insulator 12 may even be a gas such as the air.

To prevent the induced current that flows under the magnetic field generated by the inductor 13 from forming a closed loop, the thermal conductor 11 of this preferred embodiment has its conductive path disconnected by the decoupled portions 18. For example, in the arrangement illustrated in FIG. 3, the thermal conductor 11 has three decoupled portions 18 inside the principal plane of the inductor and one decoupled portion 18 inside the cooling member 16. In this case, the heat-dissipating end of the thermal conductor 11 is preferably arranged inside the cooling member 16 so as not to be short-circuited or grounded. However, the number and positions of the decoupled portions 18 to cut do not have to be as shown in FIG. 3 but the conductive path just needs to be disconnected in one position to say the least. Furthermore, the decoupled portion 18 may be located inside or outside of the range that is defined by the profile of the inductor 13. Also, according to this preferred embodiment, the thermal conductor 11 is arranged so as not to be grounded with respect to the internal circuit 15. As a result, it is possible to prevent a closed loop from being formed and producing unwanted induced current.

Hereinafter, a preferred arrangement for the thermal conductor 11 will be described with reference to FIGS. 4A, 4B and 4C.

Figure 4A:
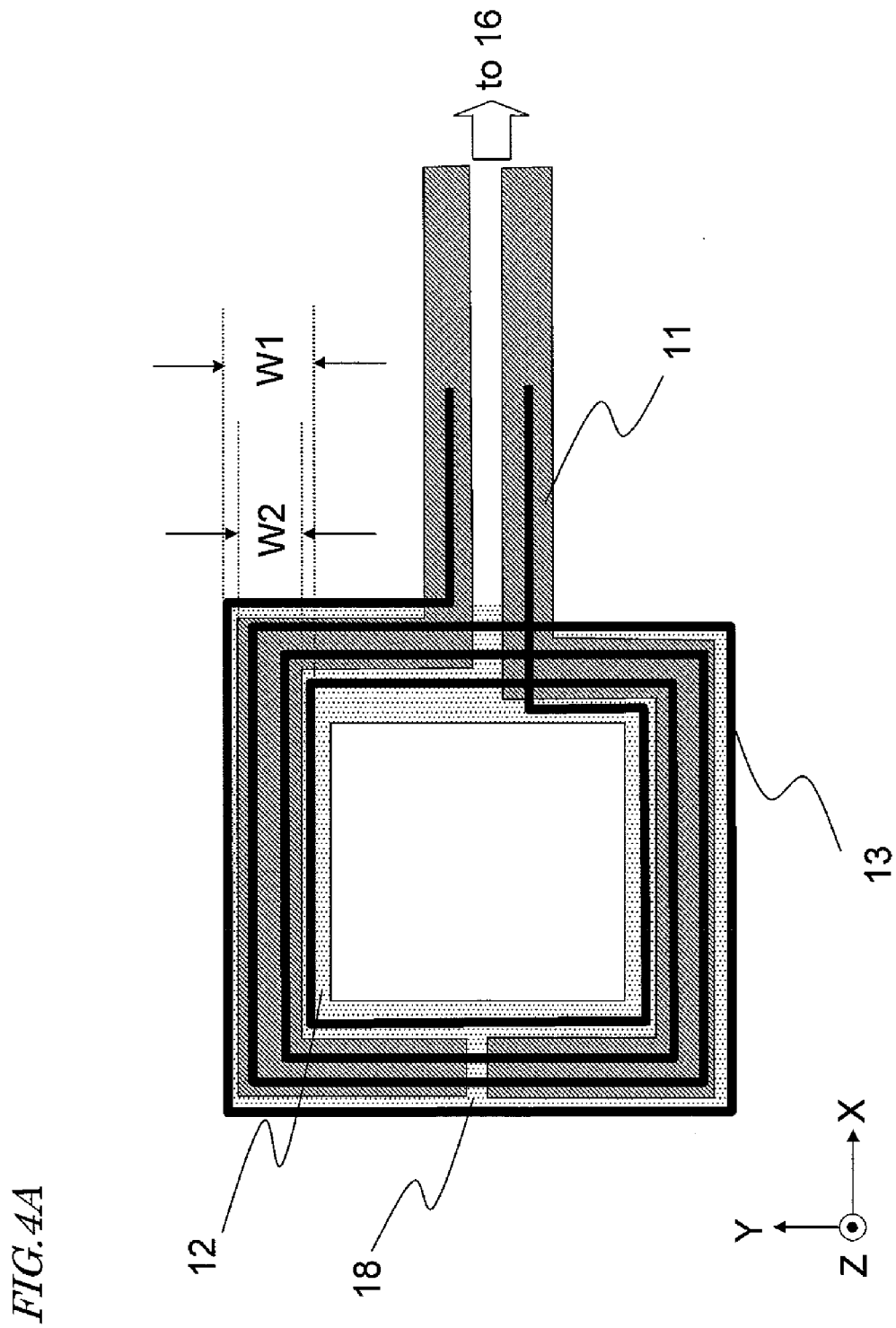
FIG. 4A illustrates a preferred layout on the XY plane for the thermal conductor 11, the electrical insulator and the inductor 13 according to the first preferred embodiment of the present invention.
Figure 4B:
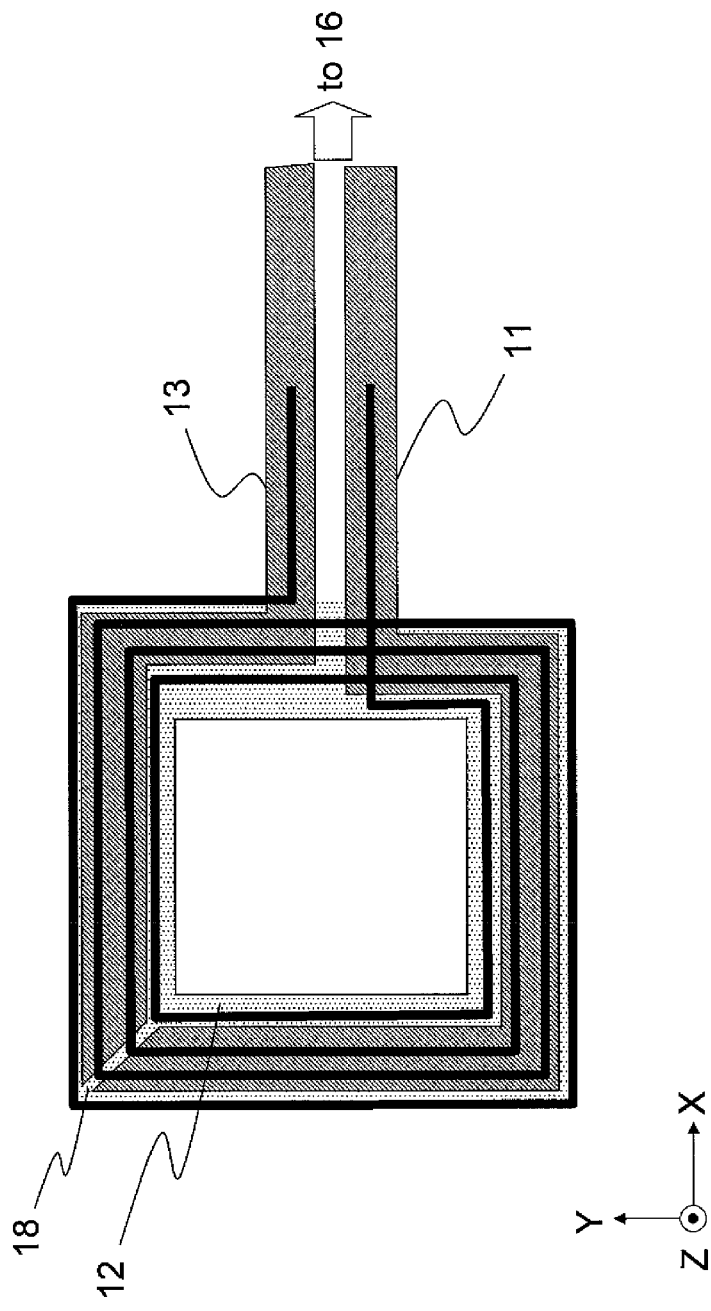
FIG. 4B illustrates an example in which the decoupled portion 18 of the thermal conductor 11 is arranged near a bent portion of the inductor 13 in the first preferred embodiment of the present invention.

FIG. 4A illustrates a preferred layout on the XY plane for the thermal conductor 11, the electrical insulator and the turns of the inductor 13. In the example illustrated in FIG. 4A, the inductor 13 has a rectangular shape unlike its counterpart 13 shown in FIG. 3. However, the inductor 13 may have any appropriate shape.

In this case, that portion of the thermal conductor 11 that makes thermal contact with the inductor 13 with the electrical insulator 12 interposed between them as described above will be referred to herein as a "contact portion". The thermal conductor 11 is preferably arranged so that when projected onto the principal plane of the inductor 13, the contact portion of the thermal conductor 11 is located between the outermost and innermost parts of the turns of the inductor 13. In other words, it is preferred that the contact portion of the thermal conductor 11 have a narrower projected width than the inductor 13. As used herein, the "projected width" of the inductor 13 means the distance W1 between the outermost and innermost parts of the turns of the inductor 13 on its principal plane. On the other hand, the "projected width" of the thermal conductor 11 means the width W2 of the thermal conductor 11 as measured perpendicularly to the turns direction of the inductor 13 on the XY plane. The amount of induced current flowing through the thermal conductor 11 depends on the projected width of the thermal conductor 11. That is to say, the greater the projected width of the thermal conductor 11 with respect to that of the inductor 13, the more easily the thermal conductor 11 will be affected by the magnetic field generated by the inductor 13 and the larger amount of induced current to flow. Consequently, the transfer efficiency decreases. Conversely, the narrower the projected width, the smaller the area of the contact portion between the thermal conductor 11 and the inductor 13 and the smaller the quantity of heat that can be dissipated. In view of these considerations, the projected width of the thermal conductor 11 is optimized with the required transfer efficiency and quantity of heat to dissipate taken into account.

Also, according to this preferred embodiment, the thermal conductor 11 is preferably arranged so as to contact with approximately a center portion of the turns of the inductor 13 as shown in FIG. 4A. It should be noted that if the wiring resistance is reduced in the inner portion of the spiral inductor 13 where both current and magnetic field have rather high densities, the Q factor of the resonator can be increased more easily than a situation where the wiring resistance is reduced in the outer portion of the spiral inductor. For that reason, the thermal conductor 11 may be arranged so as to make thermal contact with a portion of the turns of the inductor 13 that is located closer to the outer edge than the center thereof.

If the decoupled portion 18 of the conducting path of the thermal conductor 11 needs to be located within the spiral turns of the inductor 13, the decoupled portion 18 is preferably arranged near a bent portion of the turns. FIG. 4B illustrates an example in which the decoupled portion 18 is arranged near a bent portion of the turns. Generally speaking, the magnetic field generated has higher density near a bent portion of the turns than near a straight portion of the turns.

That is why if the electrically conductive portion of the thermal conductor 11 is arranged in the vicinity of the bent portion, a larger amount of induced current will flow, and therefore, more energy will be lost. For that reason, the decoupled portion 18 is preferably arranged near a bent portion of the turns, not near a straight portion thereof.

Figure 4C:
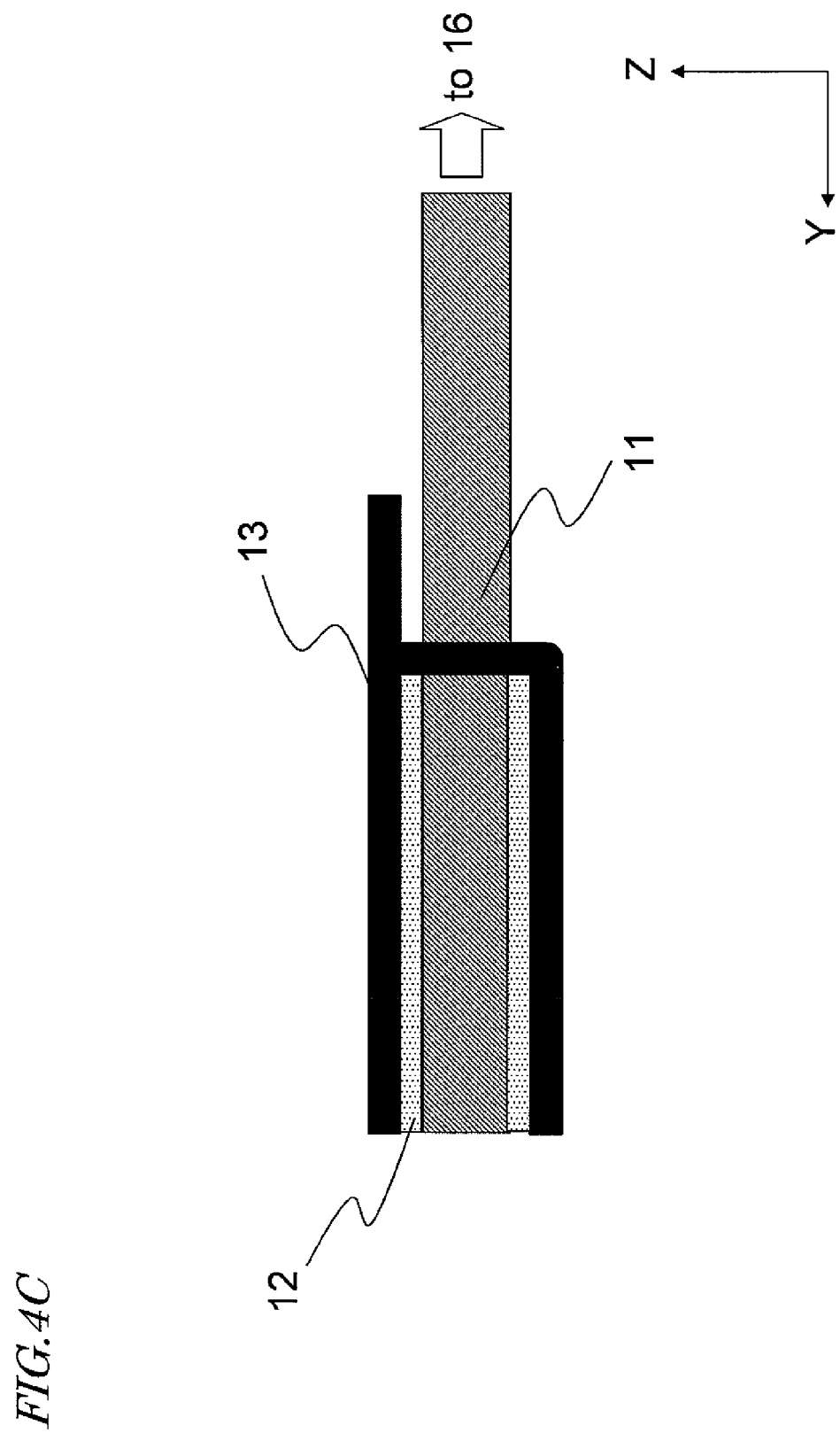
FIG. 4C illustrates the relative arrangement of the thermal conductor 11, the electrical insulator 12 and the inductor 13 in the Z-axis direction in the first preferred embodiment of the present invention.

FIG. 4C illustrates the relative arrangement of the thermal conductor 11, the electrical insulator 12 and the inductor 13 in the Z-axis direction. In the example illustrated in FIG. 4C, the inductor 13 has a structure with two winding layers that have a predetermined gap between them in the Z-axis direction. If the inductor 13 has such a structure with multiple winding layers, it is preferred that the thermal conductor 11 be arranged between the winding layers of the inductor 13 in the Z-axis direction as shown in FIG. 4C. By arranging the thermal conductor 11 this way, the heat generated by the inductor 13 can be transferred to the cooling member 16 efficiently. If such an arrangement is adopted, the electrical insulator 12 is arranged between the winding layers of the inductor 13 and the thermal conductor 11 in the Z-axis direction to keep the winding layers of the inductor 13 and thermal conductor 11 electrically insulated from each other. In this case, the electrical insulator 12 is preferably as thin as possible unless the insulator 12 is too thin to electrically insulate the thermal conductor 11 and the winding layers of the inductor 13 from each other. In the example illustrated in FIG. 4C, the inductor 13 has two winding layers. However, even if the inductor 13 has three or more winding layers, the electrical insulator 12 is also preferably arranged between those winding layers in the Z-axis direction.

Thus, it is preferred that the contact portion of the thermal conductor 11 with the inductor 13 be located within the range that is defined by the turns (i.e., the profile) of the inductor 13 both on the XY plane and in the Z-axis direction. By arranging the thermal conductor 11 in this manner, the contact portion between the thermal conductor 11 and the inductor 13 can have a broader range, and therefore, the heat dissipation effect can be increased.

As described above, the heat dissipation structure 111 of this preferred embodiment can not only efficiently dissipate the heat generated by the inductor 13 but also minimize the decrease in transfer efficiency as well. If current flows through the inductor 13 while electric power is being transmitted, Joule heat will be generated due to the inductor's own DC resistance component. The Joule heat is generated in the turns that form a major part of the inductor 13. That is why in an inductor with multiple spiral winding layers, it is important to efficiently conduct the internally generated heat to the external space in order to increase the heat dissipation efficiency. According to this preferred embodiment, the thermal conductor 11 has high thermal conductivity and is arranged within the range that is defined by the profile of the inductor 13, and therefore, can conduct the Joule heat that has been generated by the inductor 13 to the cooling member 16 efficiently. On top of that, since the current path is cut short by the decoupled portion 18 of the thermal conductor 11, the induced current that has been generated in the thermal conductor 11 will not flow easily. Consequently, much less energy will be lost by the thermal conductor 11 and the decrease in transfer efficiency can be minimized.

In the preferred embodiment described above, the heat dissipation structure 111 is provided for the power receiver 140. However, the heat dissipation structure 111 of this preferred embodiment is applicable in quite the same way to not just the power receiver 140 but also the power transmitter 120 with the power transmitting antenna 107 for transmitting electric power to the power receiver 140. And the same effect will be achieved in the latter case, too.

Embodiment 2

Hereinafter, a second specific preferred embodiment of the present invention will be described with reference to FIGS. 5 and 6. Just like the first preferred embodiment described above, this second preferred embodiment will also be described as a power receiver 140. The power receiver 140 of this second preferred embodiment has a different inductor 13 and a different heat dissipation structure 111 from their counterparts of the first preferred embodiment described above but the other components of theirs are basically the same. That is why the following description of the second preferred embodiment of the present invention will be focused on only the differences from the power receiver 140 of the first preferred embodiment and their common features will not be described all over again to avoid redundancies. It should be noted that the heat dissipation structure 111 of this second preferred embodiment is applicable in quite the same way to not just the power receiver 140 but also a power transmitter 120 with a power transmitting antenna 107 as well.

FIG. 5 schematically illustrates a general arrangement for the power receiving resonator of this preferred embodiment. The thermal conductor 11 of this preferred embodiment has a hollow pipe structure in which a cooling medium 43 is enclosed. On the other hand, the inductor 13 of this preferred embodiment has a structure in which multiple conductive wires are wound around the thermal conductor 11 and covered with an electrical insulator 12. Those conductive wires that form the inductor 13 are connected to a capacitor 14 and an internal circuit 15. Meanwhile, the ends of the thermal conductor 11 are connected to a cooling member 16, which is arranged out of contact with the inductor 13.

The heat dissipation structure 111 of this preferred embodiment may be implemented as a heat pipe, for example. Hereinafter, such a preferred embodiment that uses a heat pipe will be described.

Generally speaking, a heat pipe has a structure in which an internal cooling medium circulates automatically due to a temperature difference produced between both ends thereof. A heat pipe has high thermal conductivity, which is approximately 100 times as high as that of a copper wire. According to this preferred embodiment, due to a temperature difference produced between the inductor 13 and the cooling member 16 when current flows through the inductor 13, the cooling medium 43 oscillates and circulates between the inductor 13 and the cooling member 16. As a result, the heat generated by the inductor 13 can be dissipated effectively. In this manner, by making the thermal conductor 11 of such a material for a heat pipe that has even higher thermal conductivity than that of the thermal conductor 11 of the first preferred embodiment described above, the same quantity of heat can be transferred by a thinner thermal conductor 11 according to this preferred embodiment. As a result, on a cross-sectional view of the thermal conductor 11 and the inductor 13 as viewed on a plane that is defined perpendicularly to the direction in which current flows through the inductor 13, the ratio of the cross section of the thermal conductor 11 to that of the inductor 13 can be reduced. Consequently, the amount of induced current to flow through the thermal conductor 11 can be reduced and the decrease in transfer efficiency can be checked even more perfectly.

According to this preferred embodiment, if a decoupled portion needs to be cut through the conducting path of the thermal conductor 11, the decoupled portion may be located closer to the cooling member 16 outside of the inductor 13 as shown in FIG. 5 or may be located inside of the range that is defined by the profile of the inductor 13. And it is preferred that decoupled portions be cut both inside and outside of the inductor 13.

If the decoupled portion is located inside the cooling member 16, the heat pipe is preferably connected to the cooling member 16 so that both ends thereof are not electrically short-circuited with each other. The heat pipe is preferably connected to a heat-dissipating fin structure 44 in the cooling member 16. By using the heat-dissipating fin structure 44, the heat that has been transferred from the inductor 13 to the ends of the heat pipe can be efficiently dissipated to the external space. It should be noted that the cooling member 16 does not always have to have such a structure but may also have any other known structure.

In FIG. 5, the ends of the heat pipe that are connected to the cooling member 16 are illustrated as short ones for convenience sake. Actually, however, the ends of the heat pipe that are connected to the cooling member 16 are preferably as long as possible. That is to say, this heat dissipation structure 111 is designed so that the ends of the heat pipe have as low a temperature as possible, i.e., so that the heat transferred from the inductor 13 through the thermal conductor 11 is dissipated as much as possible.

FIG. 6 illustrate parts of a cross section as viewed on the plane A-A' shown in FIG. 5 in a situation where a decoupled portion has been cut inside of the range that is defined by the conductive wires of the inductor 13. As shown in FIG. 6($a$), by partially disconnecting the heat pipe (including the thermal conductor 11 and the cooling medium 43) and filling the decoupled portion with a thermally conductive electrical insulator 51, the induced current to flow through the thermal conductor 11 can be reduced. Alternatively, as shown in FIG. 6($b$), the thermal conductor 11 may be disconnected halfway through its conducting path and its disconnected parts may be joined by a pipe made of the thermally conductive electrical insulator 51 as well.

As the thermally conductive electrical insulator 51, a material, of which the temperature-dependent properties such as thermal expansion coefficient are close to those of the heat pipe, is preferably used in order to minimize cooling medium leakage. It is more preferred that the cooling medium leakage be further reduced by sealing the gap with an electrically insulating resin material. If its material properties are appropriate, the electrical insulator 51 may be the same as the electrical insulator 12.

Optionally, the heat dissipation structure 111 of this preferred embodiment could be formed without using any heat pipe. For example, the thermal conductor 11 may have a pipe structure, which is made of an electrical conductor with high thermal conductivity, and may make the cooling medium 43 circulate between the inside of the pipe structure and the cooling member 16. As the cooling medium 43, a material with high dielectric constant such as poly-alpha olefin or fluorate may be used. Since such a high-dielectric-constant material has high electrical resistivity, the induced current to be generated by the magnetic field in the cooling medium 43 and unnecessary contact between conductors can be reduced significantly.

The cooling member 16 may have an electromagnetic pump, for example, and may cool the inductor 13 by circulating the cooling medium 43 intentionally. With such an arrangement, the cooling medium 43 can be circulated actively, and therefore, the thermal conductor 11 can conduct an even greater quantity of heat per unit time and per unit volume. Consequently, compared to the arrangement that uses a heat pipe, the decrease in transfer efficiency can be further checked.

EXAMPLES

Hereinafter, specific examples of the present invention will be described.

To prove the advantageous effects of the present invention, the heat dissipation effect achieved by the resonator with the arrangement shown in FIG. 3 was analyzed. In this specific example of the present invention, the power transmitting antenna had a square spiral inductor with an outside diameter of 75 mm, an inside diameter of 45 mm, a turn width of 2 mm, a turn thickness of 0.5 mm, a turn interval of 3 mm and a maximum turn number of 4. As the capacitor of the power transmitting antenna, a parallel connection of capacitors with a capacitance of 3.838 pF was used so that the power transmitting antenna would have a resonant frequency of 2 MHz.

On the other hand, the power receiving antenna had a stack of two square spiral inductors, each of which had an outside diameter of 75 mm, an inside diameter of 45 mm, a turn width of 2 mm, a turn thickness of 0.5 mm, a turn interval of 3 mm and a maximum turn number of 4 (with a spiral portion width of 17 mm) and which were connected in parallel with each other with a gap of 0.9 mm left between them as measured perpendicularly to the principal plane of the spiral inductors. Furthermore, a thermal conductor with an inside diameter of 50 mm, a width of 4 mm, and a thickness of 0.5 mm was arranged at the intermediate level between the two layers of inductors that were connected in parallel with each other. As a material for the wires of the spiral inductors and the thermal conductor, copper was used.

Also, in this specific example, the air was used as the thermally conductive electrical insulator 12 for the sake of simplicity. The reason is that even when the air was used, it had almost no influence on the decision to be made about how much the transfer efficiency would be affected by the degree of magnetic coupling produced by the inductor 13.

In specific examples of the present invention, the transfer efficiency was measured with the width of the decoupled portions 18 of the thermal conductor 11 fixed at 5 mm but with the positions and number of the decoupled portions 18 changed. More specifically, the transfer efficiency was measured by estimating the pass and reflection characteristics of the power transmitting antenna and power receiving antenna on a small signal input condition with their input and output terminals connected to a network analyzer and by setting their impedance to be the best one that would maximize the transfer efficiency between the antennas. For the purpose of comparison, the transfer efficiency of an arrangement, of which the thermal conductor 11 had no decoupled portions 18, and that of an arrangement with no thermal conductor 11 at all were also measured.

The transfer efficiencies thus measured are shown in the following Table 1, in which also shown are the capacitances of capacitors that were adjusted in the respective situations so that the resonant frequency would be 2 MHz:

TABLE 1

| Position of decoupled portions | Number of decoupled portions | Capacitance (nF) of capacitor | Transfer efficiency (%) |
| --- | --- | --- | --- |
| Inside of inductor | 3 | 3.848 | 98.248 |

TABLE 1-continued

| Position of decoupled portions | Number of decoupled portions | Capacitance (nF) of capacitor | Transfer efficiency (%) |
|---|---|---|---|
| Inside of inductor | 1 | 3.832 | 98.247 |
| Outside of inductor | 1 | 3.835 | 98.080 |
| Nowhere | 0 | 10.291 | 93.810 |
| No thermal conductor 11 | | 3.820 | 98.284 |

As can be seen from Table 1, by cutting decoupled portions through the thermal conductor 11, the transfer efficiency could be increased significantly compared to the situation where the thermal conductor 11 had no decoupled portions. Also, when the decoupled portions were cut inside of the inductor 13, the transfer efficiency could be increased by about 0.17% compared to the situation where the decoupled portions were cut outside of the inductor 13. The present inventors also confirmed that the greater the number of decoupled portions cut, the higher the transfer efficiency.

The transfer efficiencies were also measured with the width of the thermal conductor 11 of the power receiving antenna 109 changed into 8 mm and 17 mm, respectively. The results are shown in the following Table 2. In this case, the antenna had only one decoupled portion 18, which had a width of 5 mm. In Table 2, also shown are the capacitances of the capacitors 14 that were arranged in parallel with each other in the inductor 13 so that the resonant frequency would be 2 MHz in each situation:

TABLE 2

| Width (mm) of thermal conductor 11 | Capacitance (nF) of capacitor 14 | Transfer efficiency (%) |
|---|---|---|
| 8 | 3.860 | 98.053 |
| 17 | 3.984 | 97.900 |

The present inventors confirmed that the narrower the width of the thermal conductor 11, the better the transfer efficiency as can be seen from this Table 2.

If the thermal conductor 11 is made of a material with high thermal conductivity, the quantity of heat conducted per unit area can be increased. That is to say, the same quantity of heat can be conducted by a thermal conductor 11 with a narrower width. Thus, it was proved that if such a material with high thermal conductivity was used and if the width of the thermal conductor 11 was reduced, then the decrease in transfer efficiency could be minimized.

The results obtained in these specific examples of the present invention proved the unique effects of the present invention that the heat generated by the inductor 13 can be dissipated efficiently and the decrease in transfer efficiency can be minimized by using a heat dissipation structure that is made of an electrical conductor with high thermal conductivity and that does not form an electrically closed loop.

In Table 1, the highest transfer efficiency was achieved when no thermal conductor 11 was provided. This is probably because the results of this analysis do not indicate how much the transfer efficiency will be decreased by an increase in temperature. With no thermal conductor 11 provided, the temperature of the inductor will generally rise so steeply that the transfer efficiency will decrease significantly. That is why without the thermal conductor 11, the transfer efficiency would actually be lower than a situation where the thermal conductor 11 is provided. Thus, as the results of this analysis do not indicate the influence of a temperature rise, the transfer efficiency that might be achieved with no thermal conductor 11 as shown in Table 1 should be higher than the efficiency to be actually achieved without the thermal conductor 11.

The wireless power transfer system and power transmitting/receiving device of the present invention are applicable effectively to desktop and laptop computers and other kinds of office equipment and wall-mounted TV monitors, mobile AV devices and other kinds of audiovisual equipment. The system and device of the present invention can also be used to charge, and supply power to, not only medical equipment including hearing aids and healthcare devices but also a running or parked car charging system for electric cars, electric motorcycles and mobile robots as well. The system and device of the present invention can find a wide variety of applications even in a system for collecting power from a solar cell or a fuel cell, a DC power supplying system or a replacement for an AC outlet.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A power transmitting/receiving device that transmits and/or receives electric power in a wireless power transfer system that transfers the electric power wirelessly via a resonant magnetic field, the device comprising:
   an antenna with an inductor;
   a heat dissipation structure with an electrically conductive thermal conductor; and
   an electrical insulator interposed between a portion of the conductor and the inductor, the inductor not in electrical contact with the conductor,
   wherein the portion of the conductor makes thermal contact with the inductor through the electrical insulator,
   the conductor is arranged to form no electrically closed loop,
   the electrically conductive thermal conductor dissipates the heat that has been generated by the inductor by transferring that heat from the inductor to a distant location, the heat dissipation structure including a cooling member, which is arranged out of contact with the inductor, and
   the electrically conductive thermal conductor dissipates the heat that has been generated by the inductor by transferring that heat to the cooling member.

2. A power transmitting/receiving device that transmits and/or receives electric power in a wireless power transfer system that transfers the electric power wirelessly via a resonant magnetic field, the device comprising:
   an antenna with an inductor;
   a heat dissipation structure with an electrically conductive thermal conductor; and
   an electrical insulator interposed between a portion of the conductor and the inductor, the inductor not in electrical contact with the conductor,
   wherein the portion of the conductor makes thermal contact with the inductor through the electrical insulator,
   the conductor is arranged to form no electrically closed loop, and
   when projected onto the principal plane of the inductor, said portion of the electrically conductive thermal conductor that makes thermal contact with the inductor is less wide than turns of the inductor.

3. A power transmitting/receiving device that transmits and/or receives electric power in a wireless power transfer system that transfers the electric power wirelessly via a resonant magnetic field, the device comprising:
an antenna with an inductor;
a heat dissipation structure with an electrically conductive thermal conductor; and
an electrical insulator interposed between a portion of the conductor and the inductor, the inductor not in electrical contact with the conductor,
wherein the portion of the conductor makes thermal contact with the inductor through the electrical insulator,
the conductor is arranged to form no electrically closed loop,
said portion of the electrically conductive thermal conductor that makes thermal contact with the inductor at least partially falls within a range that is defined by the profile of the inductor, and
the electrically conductive thermal conductor is electrically disconnected inside of the range that is defined by the profile of the inductor.

4. A power transmitting/receiving device that transmits and/or receives electric power in a wireless power transfer system that transfers the electric power wirelessly via a resonant magnetic field, the device comprising:
an antenna with an inductor;
a heat dissipation structure with an electrically conductive thermal conductor; and
an electrical insulator interposed between a portion of the conductor and the inductor, the inductor not in electrical contact with the conductor,
wherein the portion of the conductor makes thermal contact with the inductor through the electrical insulator,
the conductor is arranged to form no electrically closed loop, and
the electrically conductive thermal conductor is electrically disconnected outside of the range that is defined by the profile of the inductor.

5. A power transmitting/receiving device that transmits and/or receives electric power in a wireless power transfer system that transfers the electric power wirelessly via a resonant magnetic field, the device comprising:
an antenna with an inductor;
a heat dissipation structure with an electrically conductive thermal conductor; and
an electrical insulator is interposed between a portion of the conductor and the inductor, the inductor not in electrical contact with the conductor,
wherein the portion of the conductor makes thermal contact with the inductor through the electrical insulator,
the conductor is arranged to form no electrically closed loop, and
the electrically conductive thermal conductor has a hollow pipe structure and is electrically disconnected at least partially.

6. The power transmitting/receiving device of claim 5, wherein the electrically disconnected parts of the electrically conductive thermal conductor are joined by a pipe that is made of an electrical insulator.

7. The power transmitting/receiving device of claim 5, wherein a cooling medium is enclosed in the electrically conductive thermal conductor.

8. The power transmitting/receiving device of claim 3, wherein the electrically disconnected parts of the electrically conductive thermal conductor are located near a bent portion of the inductor.

9. A power transmitting/receiving device that transmits and/or receives electric power in a wireless power transfer system that transfers the electric power wirelessly via a resonant magnetic field, the device comprising:
an antenna with an inductor;
a heat dissipation structure with an electrically conductive thermal conductor; and
an electrical insulator is interposed between a portion of the conductor and the inductor, the inductor not in electrical contact with the conductor,
wherein the portion of the conductor makes thermal contact with the inductor through the electrical insulator,
the conductor is arranged to form no electrically closed loop, and
said portion of the electrically conductive thermal conductor that makes thermal contact with the inductor is arranged closer to the outer edge of turns of the inductor than to the center thereof.

* * * * *